(12) United States Patent
Yu et al.

(10) Patent No.: US 10,554,797 B2
(45) Date of Patent: Feb. 4, 2020

(54) MOBILE TERMINAL, SHELL MODULE, DISPLAY MODULE, AND METHOD OF ASSEMBLING DISPLAY MODULE

(71) Applicant: GUANGDONG OPPO MOBILE TELECOMMUNICATIONS CORP., LTD., Guangdong (CN)

(72) Inventors: Weibin Yu, Guangdong (CN); Maozhao Huang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/659,321

(22) Filed: Jul. 25, 2017

(65) Prior Publication Data

US 2018/0034948 A1 Feb. 1, 2018

(30) Foreign Application Priority Data

Jul. 26, 2016 (CN) .......................... 2016 1 0600385

(51) Int. Cl.
*H04M 1/02* (2006.01)
*G06F 1/16* (2006.01)
*G06K 9/00* (2006.01)

(52) U.S. Cl.
CPC ........ *H04M 1/0266* (2013.01); *G06F 1/1637* (2013.01); *G06K 9/00053* (2013.01); *H04M 1/0283* (2013.01)

(58) Field of Classification Search
None
See application file for complete search history.

(56) References Cited

U.S. PATENT DOCUMENTS 9,830,493 B2 * 11/2017 Bechtel .............. G06K 9/00013
2007/0067640 A1 3/2007 Murata et al.
(Continued)

FOREIGN PATENT DOCUMENTS

CN 104933413 A 9/2015
CN 204791054 U 11/2015
(Continued)

OTHER PUBLICATIONS

International Search Report (ISR) and Written Opinion (WO) dated Nov. 2, 2017 for International Application No. PCT/CN2017/094236.

(Continued)

*Primary Examiner* — Mohammed Rachedine
(74) *Attorney, Agent, or Firm* — Ladas & Parry LLP

(57) ABSTRACT

A display module is provided. The display module includes a cover plate, a display screen, a fixing bracket, a fingerprint module, and at least one fastener. The cover plate defines a mounting recess. The display screen is attached at a back wall of the cover plate, and the display screen defines a display region. The fixing bracket is located adjacent to the mounting recess, and a mounting groove is defined by the fixing bracket and the mounting recess. The fingerprint module is mounted in the mounting groove. The fixing bracket and the fingerprint module are detachable mounted by the at least one fastener. A mobile terminal, a shell module, and a method of assembling display module is also provided.

17 Claims, 13 Drawing Sheets

(56) References Cited

U.S. PATENT DOCUMENTS

| | | | | |
|---|---|---|---|---|
| 2013/0108124 A1* | 5/2013 | Wickboldt | ......... | G06K 9/00053 |
| | | | | 382/124 |
| 2013/0307818 A1* | 11/2013 | Pope | ....................... | G06F 3/044 |
| | | | | 345/174 |
| 2015/0334859 A1* | 11/2015 | Lee | ...................... | H05K 5/0247 |
| | | | | 361/749 |
| 2017/0091514 A1* | 3/2017 | Kang | ................. | G06K 9/00013 |

FOREIGN PATENT DOCUMENTS

| | | |
|---|---|---|
| CN | 105225872 A | 1/2016 |
| CN | 105657094 A | 6/2016 |
| CN | 106066673 A | 11/2016 |
| CN | 205961234 U | 2/2017 |
| CN | 205992193 U | 3/2017 |

OTHER PUBLICATIONS

English abstract of CN 105225872 A.
English abstract of CN 204791054 U.
English abstract of CN 106066673 A.
English abstract of CN 205992193 U.
English abstract of CN 205961234 U.
English abstract of CN 105657094 A.
English abstract of CN 104933413 A.

* cited by examiner placing the fixing bracket on the rear side of the mounting recess, wherein at least a part of the outer peripheral edge of the fixing bracket extends to the rear side of the cover plate, and is connected to the cover plate, a mounting groove is defined by the mounting recess and the cover plate — S20 locating the fingerprint module into the mounting groove from the front side of the cover plate, and attaching the fingerprint module to the fixing bracket — S21 fixing the fixing bracket and the fingerprint module by the fastener from the rear side direction — S22

FIG. 13

MOBILE TERMINAL, SHELL MODULE, DISPLAY MODULE, AND METHOD OF ASSEMBLING DISPLAY MODULE

CROSS-REFERENCE TO RELATED APPLICATIONS

This application claims all benefits accruing under 35 U.S.C. § 119 from China Patent Application No. 201610600385.4, filed on Jul. 26, 2016 in the State Intellectual Property Office of China, the contents of which are hereby incorporated by reference.

FIELD

The present disclosure relates to the field of mobile device, and particularly relates to a mobile terminal, a shell module, a display module, and a method of assembling display module.

BACKGROUND

In the traditional mobile device, the fingerprint module is fixed to the cover plate. While it is necessary to replace or repair the fingerprint module, it is difficult to remove the fingerprint module from the cover plate. Furthermore, the cover plate is easily damaged during removing the fingerprint module from the cover plate.

BRIEF DESCRIPTION OF THE DRAWINGS

FIG. 13 shows a flowchart of one embodiment of a method of assembling display module.

DETAILED DESCRIPTION

Figure 1:
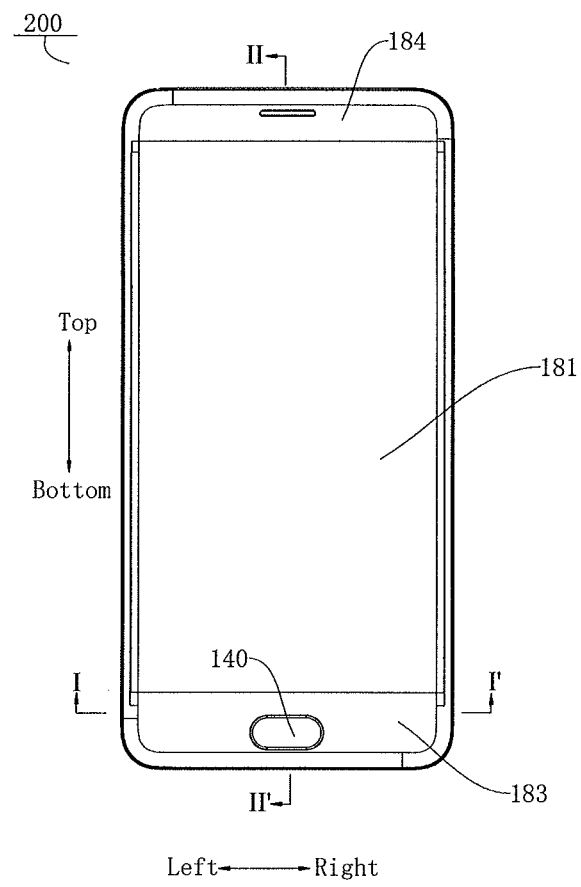
FIG. 1 shows a schematic view of one embodiment of a shell module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

The embodiments of the present invention are described in detail below, examples of which are shown in the accompanying drawings. The embodiments described below with reference to the accompanying drawings are exemplary and are intended to be illustrative of the invention and are not to be construed as limiting the invention.

In the description of the present invention, it can be understood that, the terms "center", "upper", "down", "front", "rear", "left", "right", "vertical", "top", "bottom", "inside", "outside", "surrounding" are based on the azimuth or the positional relationship shown in the drawings. The terms are used for the purpose of facilitating the description of the invention and simplified description. Rather than indicating that the device or element must have a specific orientation, constructed and operated in a particular orientation, and therefore cannot be construed as limiting the invention.

It should be noted that the mobile terminal may be a mobile phone, a tablet computer, or a notebook computer. The display module and the shell module may be used on the mobile terminals.

Figure 2:
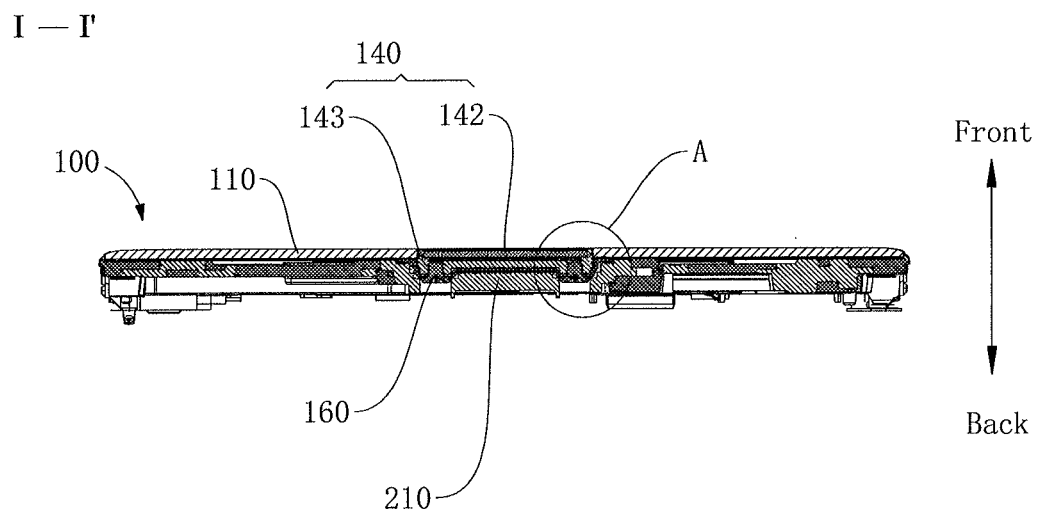
FIG. 2 shows a schematic cross-section view along line I-I' of the shell module in FIG. 1.
Figure 3:
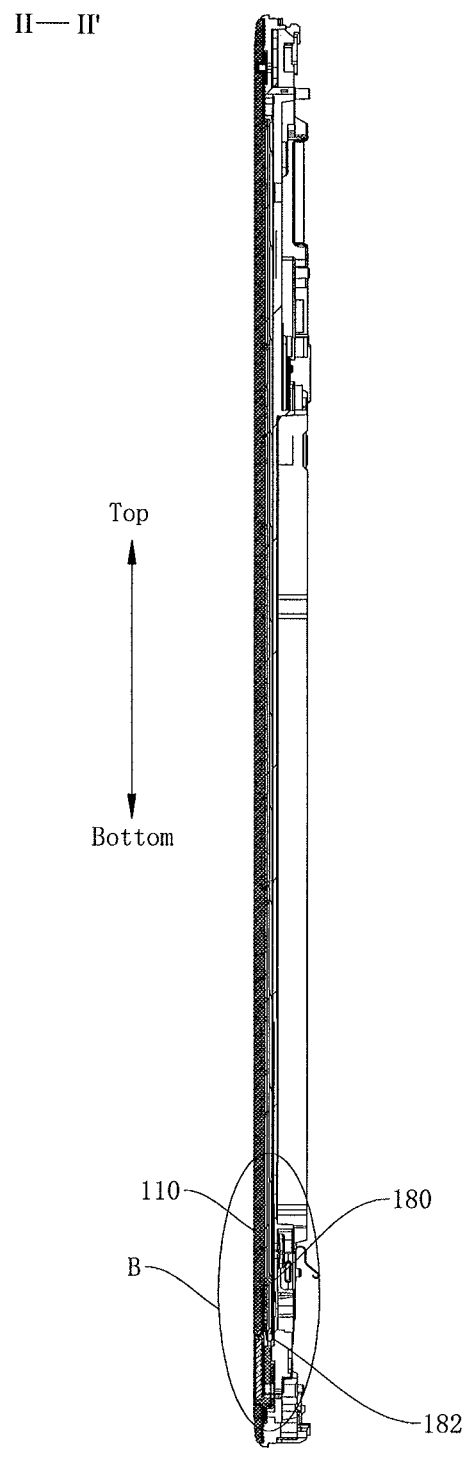
FIG. 3 shows a schematic cross-section view along line of the shell module in FIG. 1.

Referring to FIGS. 1-3, one embodiment of a shell module 200 comprises an upper cover 210 and a display module 100. The upper cover 210 is located under the display module 100. The display module 100 comprises a first edge region 183, a display region 181, and a second edge region 184. The first edge region 183 is distributed at a bottom edge of the display module 100, the second edge region 184 is distributed at a top edge of the display module 100, and the display region 181 is located between the first edge region 183 and the second edge region 184.

The display module 100 comprises a cover plate 110, a fixing bracket 120, a fingerprint module 140, a fastener 160, and a display screen 180. The display screen 180 is attached at a back wall of the cover plate 110, and the display region 181 corresponds to the display screen 180. The fingerprint module 140 is located at the middle of the first edge region 183. Thus, the layout of the fingerprint module 140 is optimized, and the appearance aesthetics of the display module 100 can also be improved. The earpiece, the photosensitive hole, and the camera can be arranged in the second sidebar region 184.

Figure 4:
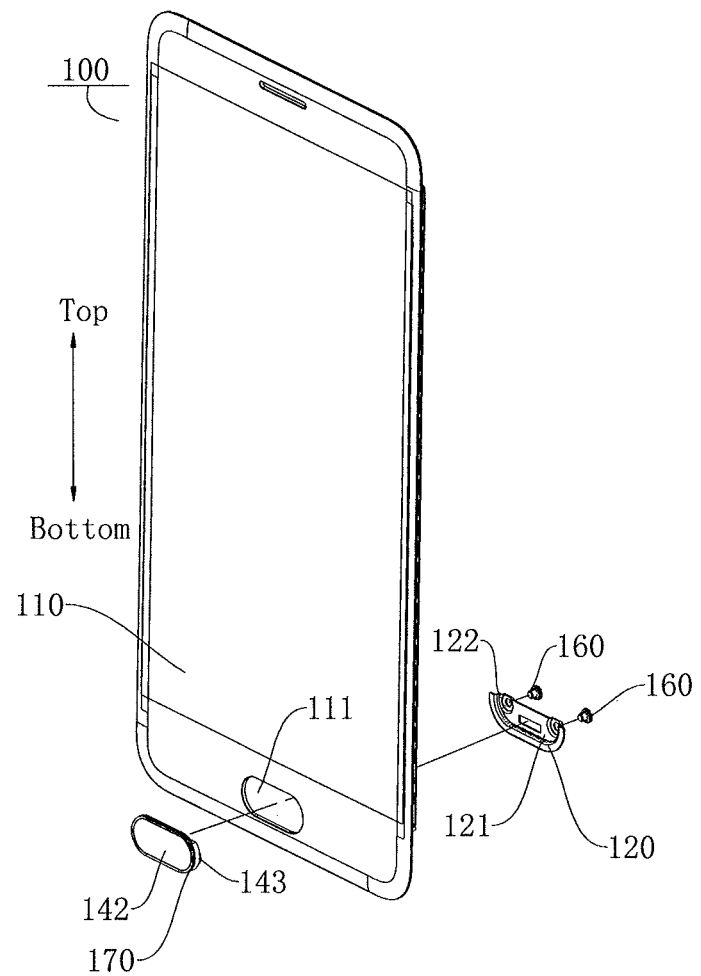
FIG. 4 shows an exploded view of another embodiment of a display module.
Figure 5:
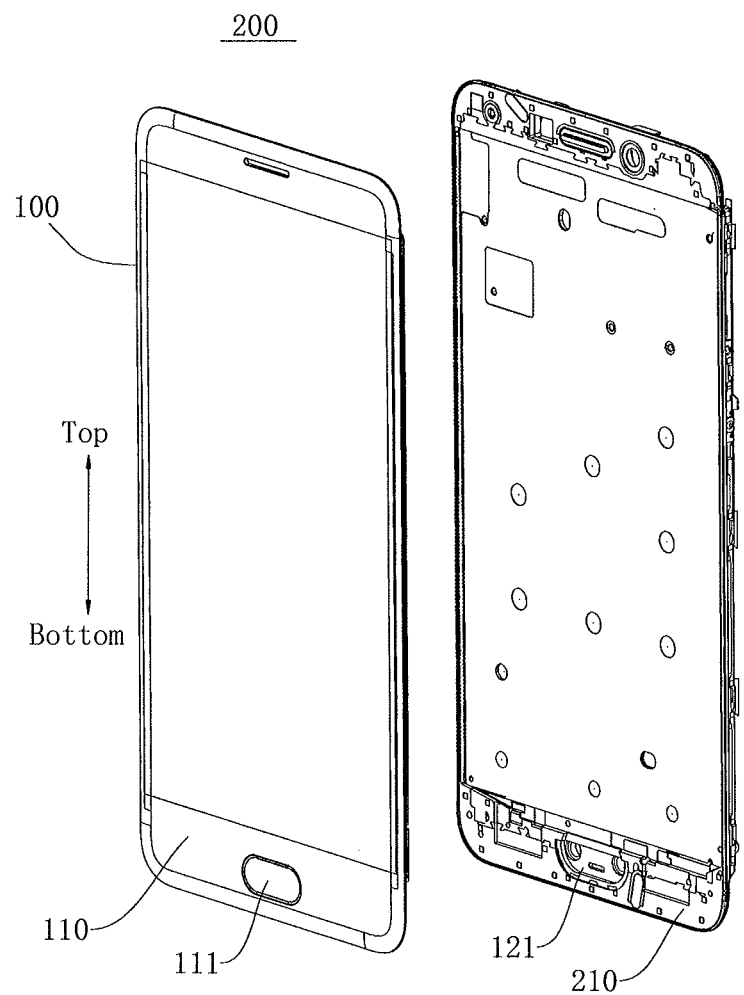
FIG. 5 shows an exploded view of one embodiment of the shell module.

Further referring to FIGS. 4-5, a mounting recess 111 is defined on the cover plate 110, and the mounting recess 111 is configured to receive the fingerprint module 140. The fingerprint module 140 is smaller than the mounting recess. Thus the fingerprint module 140 is capable of being detached from the front of the cover plate 110 while the fingerprint module 140 is separated from the fixing bracket 120. The fixing bracket 120 is located adjacent to the mounting recess 111. In addition, the fixing bracket 120 is located at the back of the mounting recess 111, and a mounting groove 121 is defined between the fixing bracket 120 and the cover plate 110. The fingerprint module 140 is embedded in the mounting recess 111. The fingerprint module 140 and the fixing bracket 120 are detachably assembled together via the fastener 160. Furthermore, the fingerprint module 140 is detachably mounted in the mounting groove 121.

In order to fix the fixing bracket 120 to the cover plate 110, the fixing bracket 120 can be bonded and connected to the cover plate 110. The fixing bracket 120 can be mounted between the cover plate 110 and the upper cover 210. Furthermore, an outer edge of the fixing bracket 120 extends toward the cover plate 110 and attached to the cover plate 110. In one embodiment, the fixing bracket 120 can be attached to the cover plate 110 via an adhesive layer 130.

In the display module 100, because the fingerprint module 140 is detachably mounted in the mounting groove 121, the fingerprint module 140 is easily assembled to the cover plate 110 and taken out from the mounting groove 121 by releasing the fastener 160. Thus the fingerprint module 140 can be easily repaired or replaced.

Figure 6:
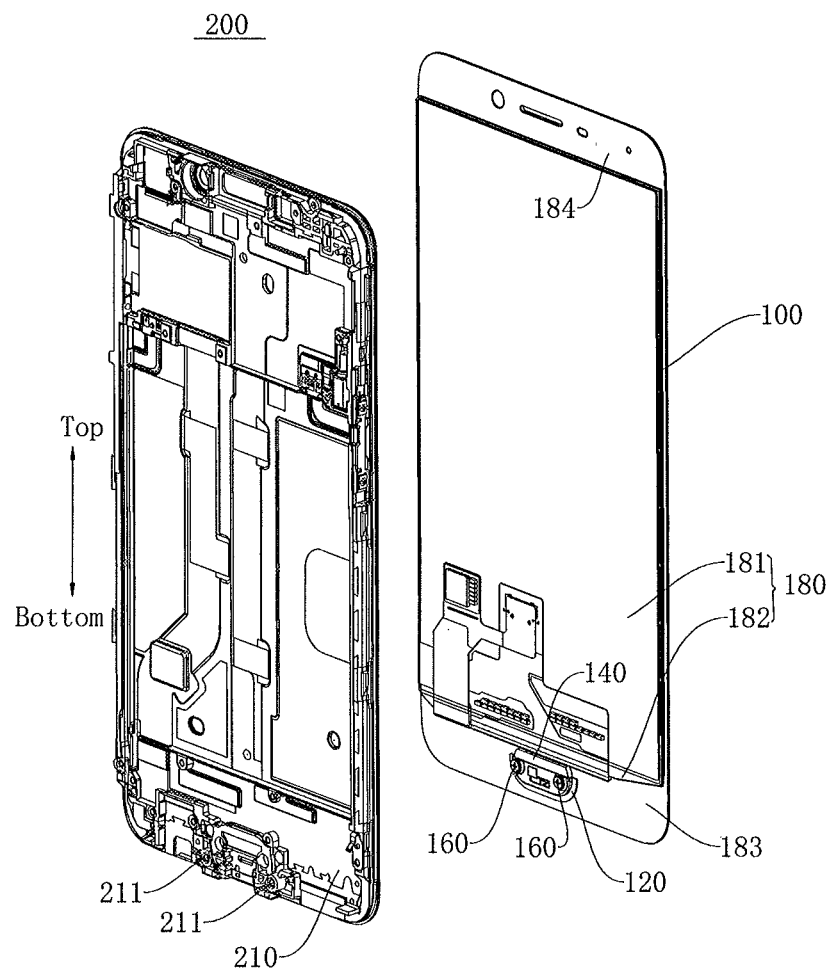
FIG. 6 shows an exploded view of another embodiment of the shell module.
Figure 7:
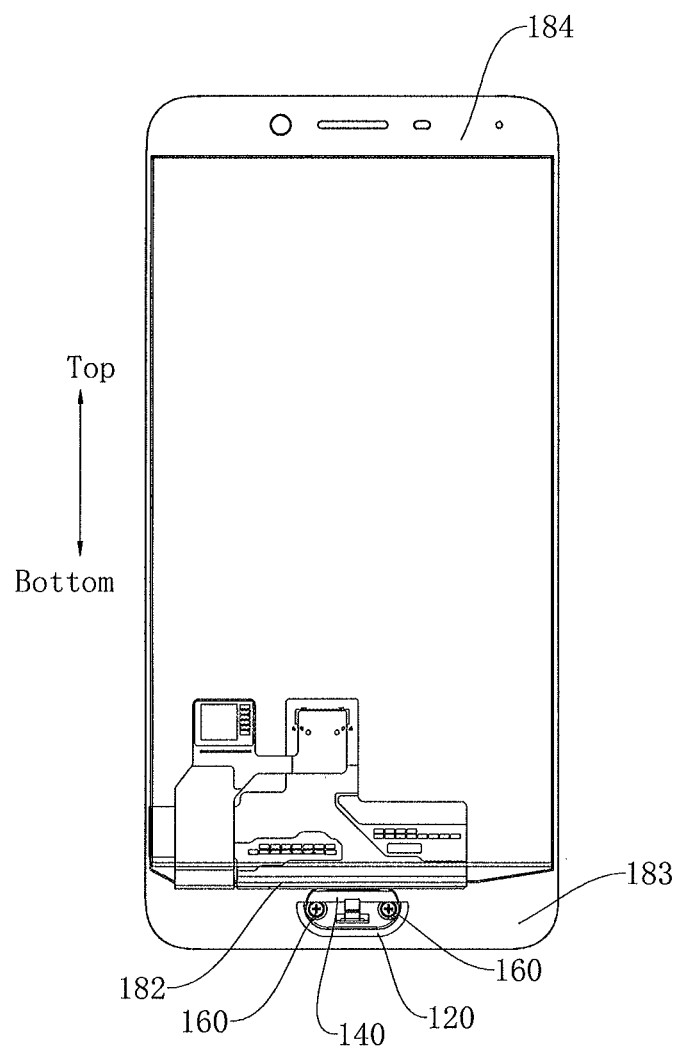
FIG. 7 shows a schematic view of one embodiment of a display module.

Further referring to FIGS. 6-7, in one embodiment, there are a plurality of fasteners 160 in the display module 100. Thus the fixing bracket 120 can be firmly assembled with the fingerprint module 140. The fastener 160 can be a screw fastener. Furthermore, the screw fastener can be threaded screws, easily to get and cheap.

Figure 8:
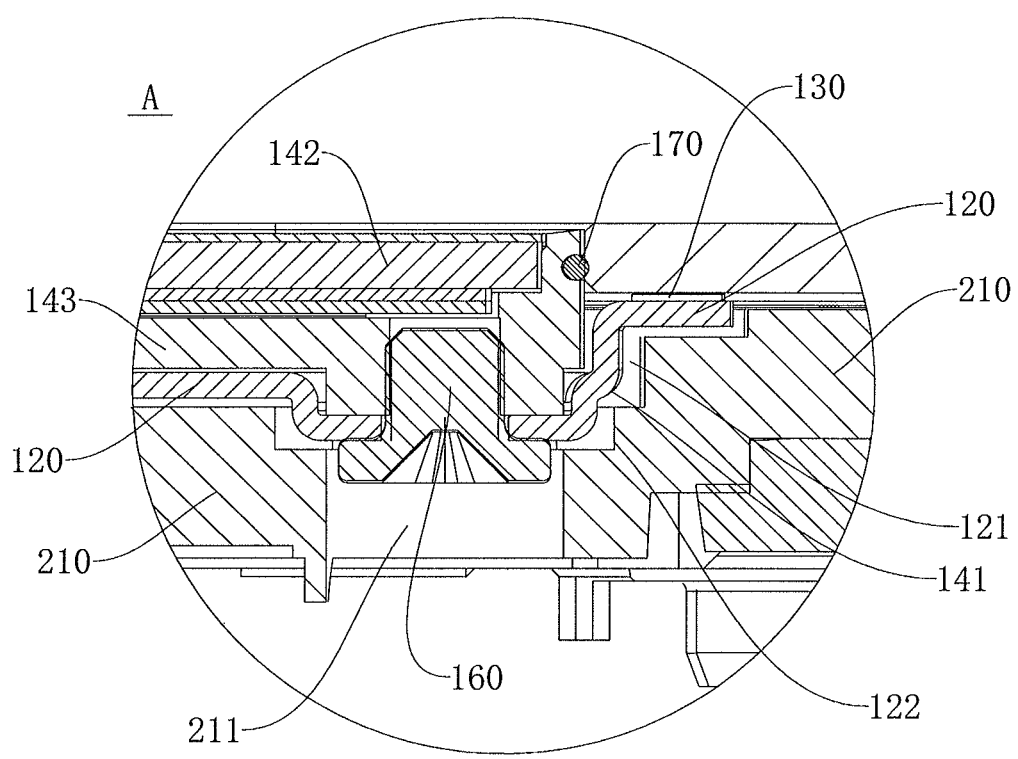
FIG. 8 shows a schematic enlarged view of a portion A in the shell module in FIG. 2.
Figure 9:
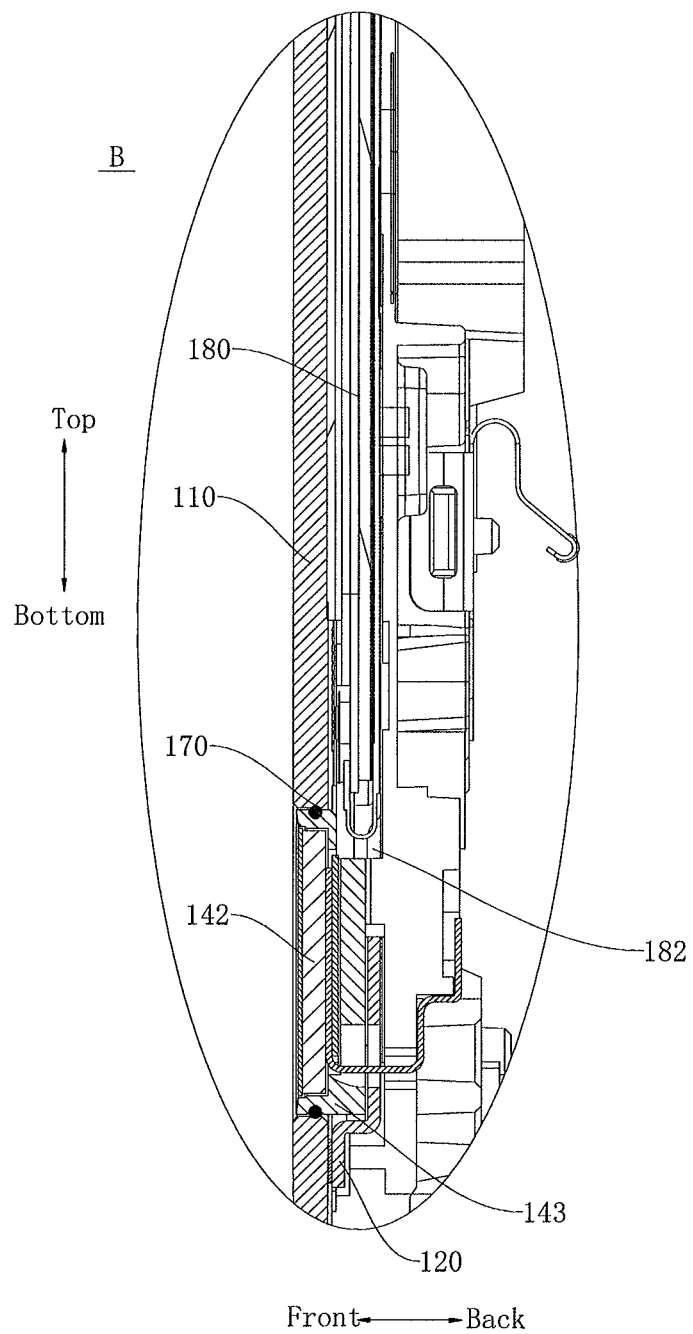
FIG. 9 shows a schematic enlarged view of a portion B in the shell module in FIG. 3.

Further referring to FIGS. 8-9, in one embodiment, the mounting groove 121 has a stepped portion 122, and the fingerprint module 140 has a fitting portion 141 adapted to the stepped portion 122. Thus a contact area between the fingerprint module 140 and the fixing bracket 120 can be increased, and the fingerprint module 140 can be reliably mounted in the mounting groove 121. In addition, while the fingerprint module 140 needs to be detached from the fixing bracket 120, the stepped portion 122 can also guide the fingerprint module 140 from the fixing bracket 120. Thus it is convenient to separate the fingerprint module 140 from the fixing bracket 120.

In one embodiment, a FPC area 182 of the display screen 180 is located at the back of the display screen 180, and a part of the fingerprint module 140 overlaps the FPC area 182. Furthermore, the FPC area 182 can be distributed at the bottom side of the display screen 180. It can be noted that, the FPC area 182 may be configured to place components such as flexible circuit boards. Therefore, the layout of the fingerprint module 140 can be optimized, and the fingerprint module 140 can be easily arranged at the center of the first edge region 183. Furthermore, because the FPC area 182 is disposed below the display area 181, the area of the second edge area 184 can be increased, so that the arrangement of the components in the second e area 184 can be optimized.

The fingerprint module 140 can comprise a fingerprint identification unit 142 and a fingerprint trim 143. The fingerprint identification unit 142 is embedded in the fingerprint trim 143. Furthermore, the fingerprint identification unit 142 can be bonded to the fingerprint trim 143. The fixing bracket 120 is detachably connected to the fingerprint trim 143 by the fastener 160. Thereby, it is easy to assemble or disassemble the fingerprint module 140 from the mounting recess 111.

In one embodiment, the upper cover 210 is located at the back of the display module 100 and is bonded to the display module 100. The upper cover 210 defines a through hole 211 opposed to the fastener 160. The fastener 160 can be operated through the through hole 211. For example, while the fastener 160 is required to be mounted to the fingerprint module 140 and the fixing bracket 120, the fastener 160 fastened through the through hole. While the fastener 160 needs to be detached from the fingerprint module 140 and the fixing bracket 120, it can be loosened through the through hole 211. Furthermore, the fixing bracket 120 can be connected to the upper cover 210.

In the shell module 200, the fingerprint module 140 is detachably mounted in the mounting groove 121 by the fastener 160, thus the fingerprint module 140 is easily assembled to the cover plate 110. While the fingerprint module 140 needs to be replaced or repaired, the fastener 160 is released to remove the fingerprint module 140 from the mounting groove 121. Therefore, the fingerprint module 140 is convenient to be repaired and maintained.

Figure 10:
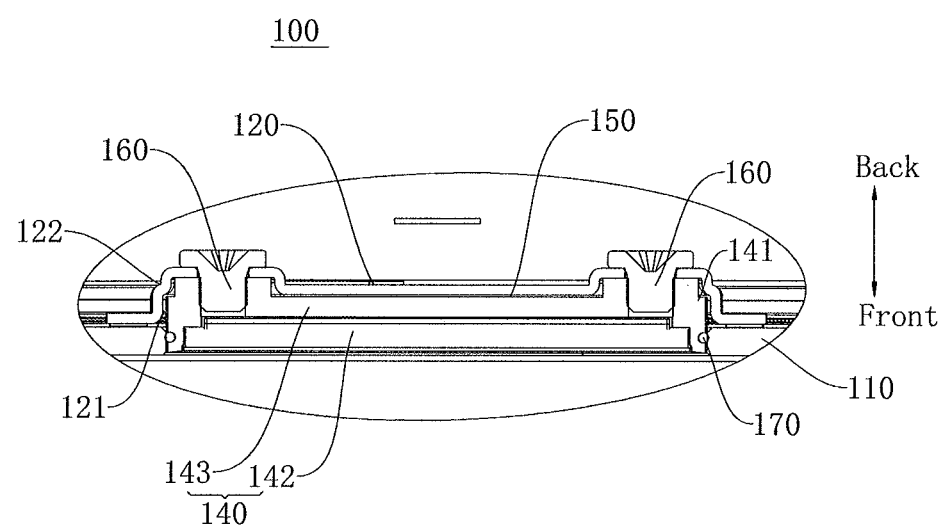
FIG. 10 shows a schematic view of one embodiment of an enlarged portion of the display module.

Further referring to FIG. 10, in order to improve the stability and reliability between the fingerprint module 140 and the fixing bracket 120, an adhesive coating 150 is provided between the fingerprint module 140 and the fixing bracket 120. In one embodiment, the adhesive coating 150 may be disposed between the fingerprint module 140 and the fixing bracket 120 in the form of dispensing. That is, the adhesive coating 150 is formed as a dispensing layer with a plurality of adhesive points. In order to facilitate detach the fingerprint module 140 from the fixing bracket 120, the viscosity of the adhesive coating 150 can be weak.

Furthermore, a waterproofing ring 170 can be sandwiched between an outer peripheral wall of the fingerprint module 140 and an inner peripheral wall of the mounting recess 111. Then the waterproofing effect of the fingerprint module 140 can be improved. The waterproofing ring 170 can be a compressible waterproof ring made of a compressible material. Thus, while the fingerprint module 140 is installed inside the mounting recess 111, the waterproof ring 170 can be tightly fitted between the outer peripheral wall of the fingerprint module 140 and the inner peripheral wall of the mounting recess 111. Then the waterproofing effect can be effectively improved. Alternatively, the waterproof ring 170 can be a silicone ring or a foam ring, and an inner ring wall of the waterproof ring 170 is closely fitted to the outer peripheral wall, and an outer ring wall of the waterproof ring 170 is tightly fitted to inner peripheral wall. In order to securely mount the waterproofing ring 170 between the fingerprint module 140 and the mounting recess 111, the waterproof ring 170 is embedded in the fingerprint module 140. In one embodiment, a fitting groove is formed on the outer peripheral wall of the fingerprint module 140, and the waterproof ring 170 is fitted in the fitting groove.

Figure 11:
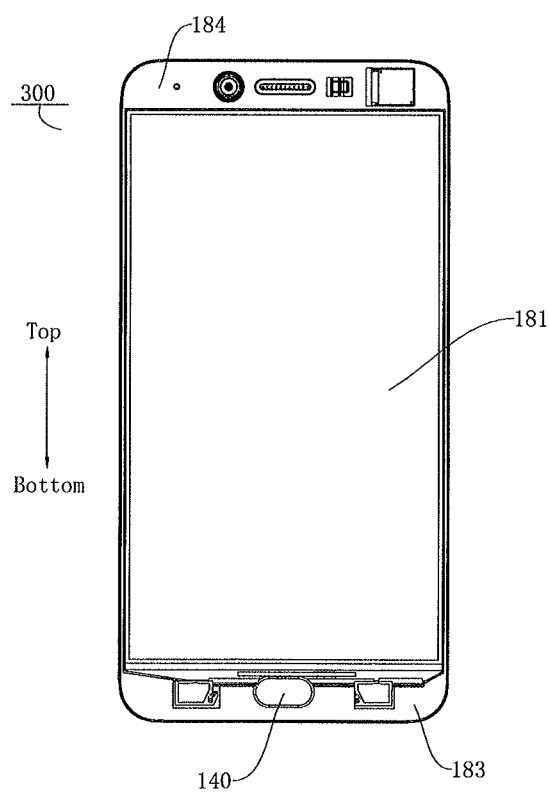
FIG. 11 shows a schematic view of one embodiment of a mobile terminal.

Further referring to FIG. 11, one embodiment of a mobile terminal 300 comprises the shell module 200. In the mobile terminal 300, the fingerprint module 140 is detachably mounted in the mounting groove 121 by the fastener 160. Thus the fingerprint module 140 is easily assembled to the cover plate 110. While the fingerprint module 140 needs to be replaced or repaired, the fastening 160 can be released to remove the fingerprint module 140 from the mounting groove 121, thereby the replacement of the fingerprint module 140 is convenient.

Figure 12:
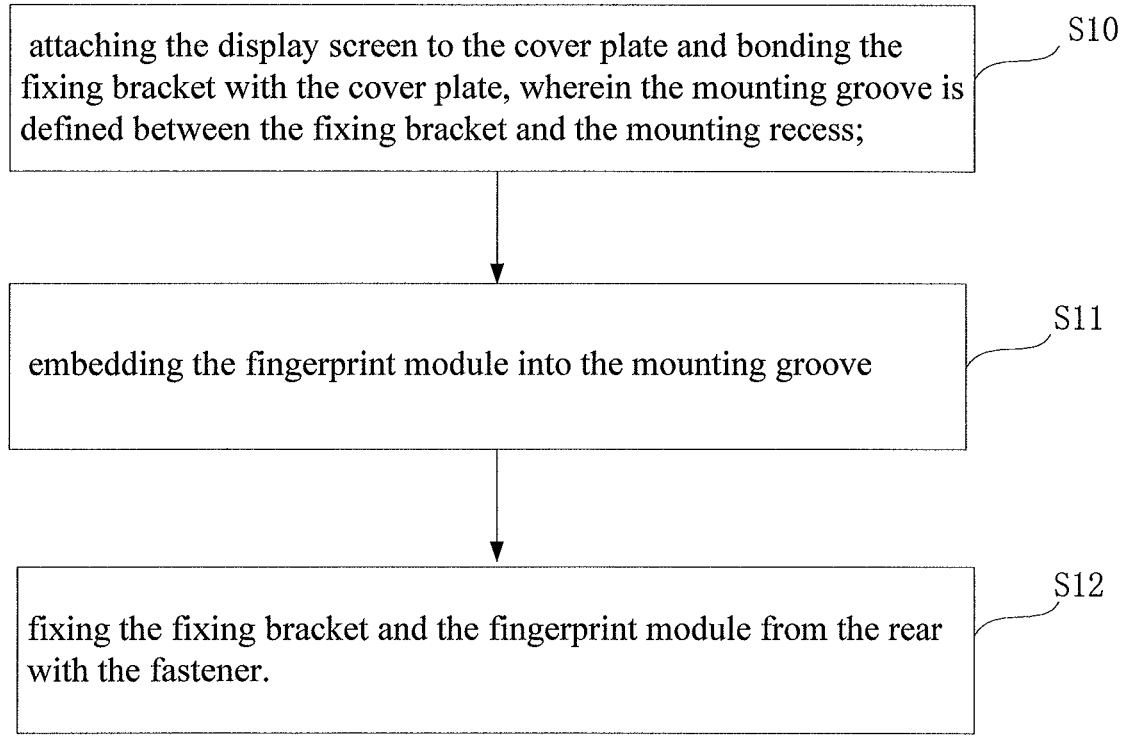
FIG. 12 shows a flowchart of one embodiment of a method of assembling display module.

Referring to FIG. 12, one embodiment of a method of assembling display module comprises:

S10, attaching the display screen to the cover plate and bonding the fixing bracket with the cover plate, wherein the mounting groove is defined between the fixing bracket and the mounting recess;

S11, embedding the fingerprint module into the mounting groove; and

S12, fixing the fixing bracket and the fingerprint module from the rear with the fastener.

In the method of assembling the display module, the fingerprint module is detachably mounted in the mounting groove by the fastener. Thus the fingerprint module can be easily fixed to the cover plate. Furthermore, while the fingerprint module needs to be repaired or replaced, the fastener can be released, and the fingerprint module can be removed from the mounting groove. Thus it is easy to replace or repair the fingerprint module.

In another embodiment, the display module 100 comprises the cover plate 110, the fixing bracket 120, the fingerprint module 140, and the fastener 160. The cover plate 110 has the mounting recess 111. The fixing bracket 120 is located at the rear side of the mounting recess 111, and the mounting groove 121 is defined by the fixing bracket 120 and the mounting recess 111, and at least a part of the outer peripheral edge of the fixing bracket 120 extends to the rear side of the cover plate 110. The fingerprint module 140 is located in the mounting groove 121, and the fastener 160 is detachably connected to the fingerprint module 140 and the fixing bracket 120. Referring to FIG. 13, the method of assembling the display module 100 can comprise the following steps:

S20, placing the fixing bracket 120 on the rear side of the mounting recess 111, wherein at least a part of the outer peripheral edge of the fixing bracket 120 extends to the rear side of the cover plate 110, and is connected to the cover plate 110, a mounting groove is defined by the mounting recess 111 and the cover plate 110;

S21, locating the fingerprint module 140 into the mounting groove 121 from the front side of the cover plate 110, and attaching the fingerprint module 140 to the fixing bracket 120; and S22, fixing the fixing bracket 120 and the fingerprint module 140 by the fastener 160 from the rear side direction.

In the method of assembling the display module 100, the fingerprint module 140 is detachably mounted in the mounting groove 121 by the fastener 160 from the rearward direction, while the fingerprint module need to be replaced or repaired, the fastener can be released to remove the fingerprint module from the mounting groove. Thus it is convenient to replace and maintain the fingerprint module.

Furthermore, in one embodiment, the step S21 comprises:

S211: placing the fingerprint module 140 in the mounting groove 121 from the front side of the cover plate 110;

S212: bonding the fingerprint module 140 and the fixing bracket 120 via an adhesive coating 150.

The adhesive of the adhesive coating 150 can be weak. Thus the connection stability and reliability between the fingerprint module 140 and the fixing bracket 120 can be improved, and the fingerprint module 140 can be easily removed from the fixing bracket 120. The adhesive coating 150 may be disposed between the fingerprint module 140 and the fixing bracket 120 in the form of dispensing.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and comprising the full extent established by the broad general meaning of the terms used in the claims. It will therefore be appreciated that the embodiments described above may be modified within the scope of the claims.

What is claimed is:

1. A display module comprising:
   a cover plate, wherein the cover plate defines a mounting recess;
   a display screen, wherein the display screen is attached at a back wall of the cover plate, and the display screen defines a display region;
   a fixing bracket, wherein the fixing bracket is located adjacent to the mounting recess, and a mounting groove is defined by the fixing bracket and the mounting recess;
   a fingerprint module, wherein the fingerprint module is mounted in the mounting groove, wherein an adhesive coating is coated between the fingerprint module and the fixing bracket; and
   at least one fastener, wherein the fixing bracket and the fingerprint module are detachably mounted by the at least one fastener.

2. The display module of claim 1, wherein the at least one fastener comprises a plurality of fasteners spaced from each other.

3. The display module of claim 1, wherein an outer edge of the fixing bracket is attached to the cover plate.

4. The display module of claim 3, wherein the outer edge of the fixing bracket is attached to the cover plate via an adhesive layer.

5. The display module of claim 1, wherein the adhesive coating is formed as a dispensing layer, and the adhesive coating comprises a plurality of adhesive points.

6. The display module of claim 1, wherein the mounting groove comprises a stepped portion, and the fingerprint module comprises a fitting portion adapted to the stepped portion.

7. The display module of claim 1, wherein a waterproofing ring is fitted between an outer peripheral wall of the fingerprint module and an inner peripheral wall of the mounting recess.

8. The display module of claim 7, wherein a fitting groove is formed on the outer peripheral wall of the fingerprint module, and the waterproofing ring is embedded in the fitting groove.

9. The display module of claim 1, wherein a first edge region and a second edge region is distributed at two opposite sides of the display region, the first edge region is distributed at a bottom edge of the display module, the second edge region is distributed at a top edge of the display module, and the fingerprint module is located at the middle of the first edge region.

10. The display module of claim 1, wherein a FPC area is located at the back of the display screen, and a part of the fingerprint module overlaps the FPC area.

11. The display module of claim 1, wherein the fingerprint module comprises a fingerprint identification unit and a fingerprint trim, and the fingerprint identification unit is embedded in the fingerprint trim.

12. The display module of claim 11, wherein the fixing bracket is detachably connected to the fingerprint trim by the at least one fastener.

13. The display module of claim 1, further comprises a upper cover located at the back of the display screen of the display module, and the upper cover and the display module forms a shell module.

14. A mobile terminal comprising:
   a display module, wherein the display module comprises:
   a cover plate, wherein the cover plate defines a mounting recess;
   a display screen, wherein the display screen is attached at a back wall of the cover plate, and the display screen defines a display region;
   a fixing bracket, wherein the fixing bracket is located adjacent to the mounting recess, and a mounting groove is defined by the fixing bracket and the mounting recess;

a fingerprint module, wherein the fingerprint module is mounted in the mounting groove, wherein an adhesive coating is coated between the fingerprint module and the fixing bracket; and at least one fastener, wherein the fixing bracket and the fingerprint module are detachably mounted by the at least one fastener;

an upper cover, wherein the upper cover is mounted to the display module, and the upper cover defines at least one through hole opposite to the at least one fastener.

15. The mobile terminal of claim 14, wherein the upper cover is mounted at the back of the display module, and the fixing bracket is connected to the upper cover.

16. The mobile terminal of claim 14, wherein a FPC area is located at the back of the display screen, and a part of the fingerprint module overlaps the FPC area.

17. The mobile terminal of claim 14, wherein the fingerprint module is detachably connected to the fixing bracket by the at least one fastener.

* * * * *